Aug. 26, 1969 L. E. CURRISTON ET AL 3,463,986
REDUCED-POWER MOTOR OPERATION
Filed Feb. 23, 1967 3 Sheets-Sheet 1
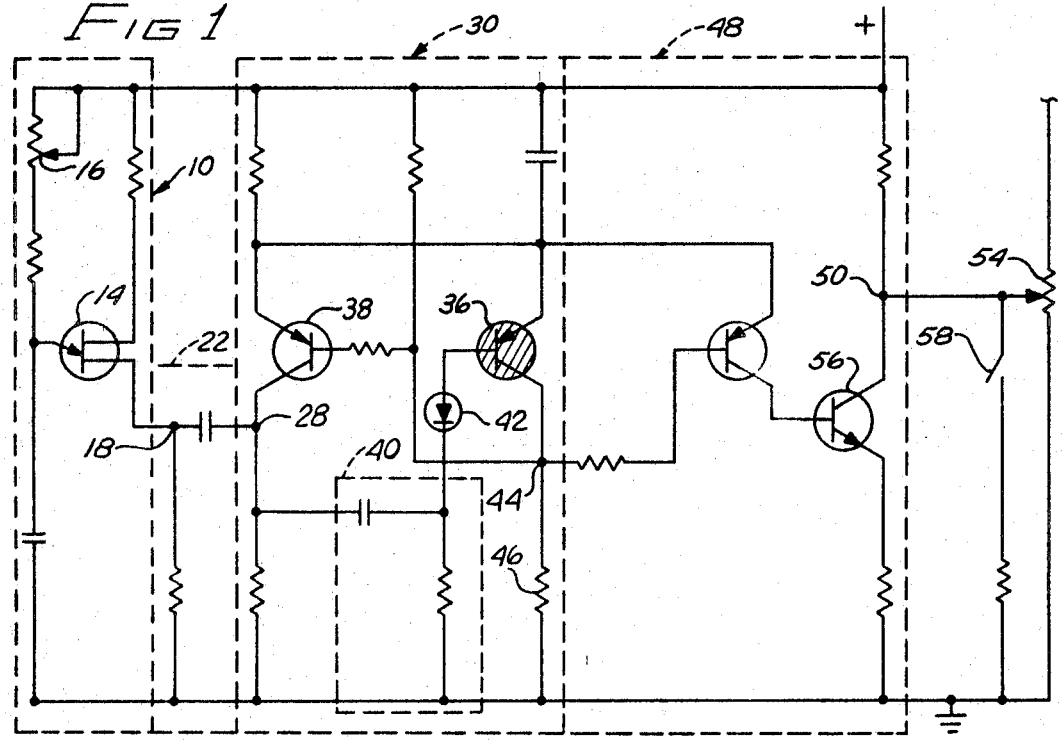
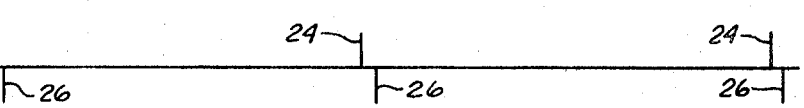
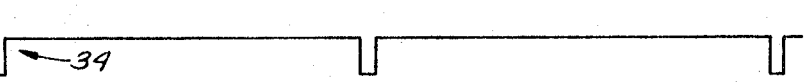
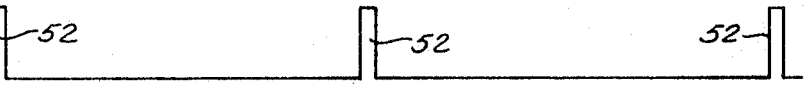
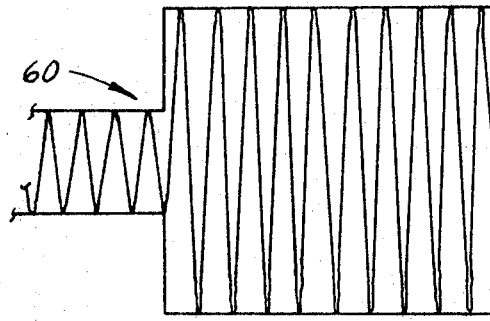
INVENTORS
LOREN E. CURRISTON
BRONIUS M. DRAUGELIS
BY
Sidney Magner
AGENT

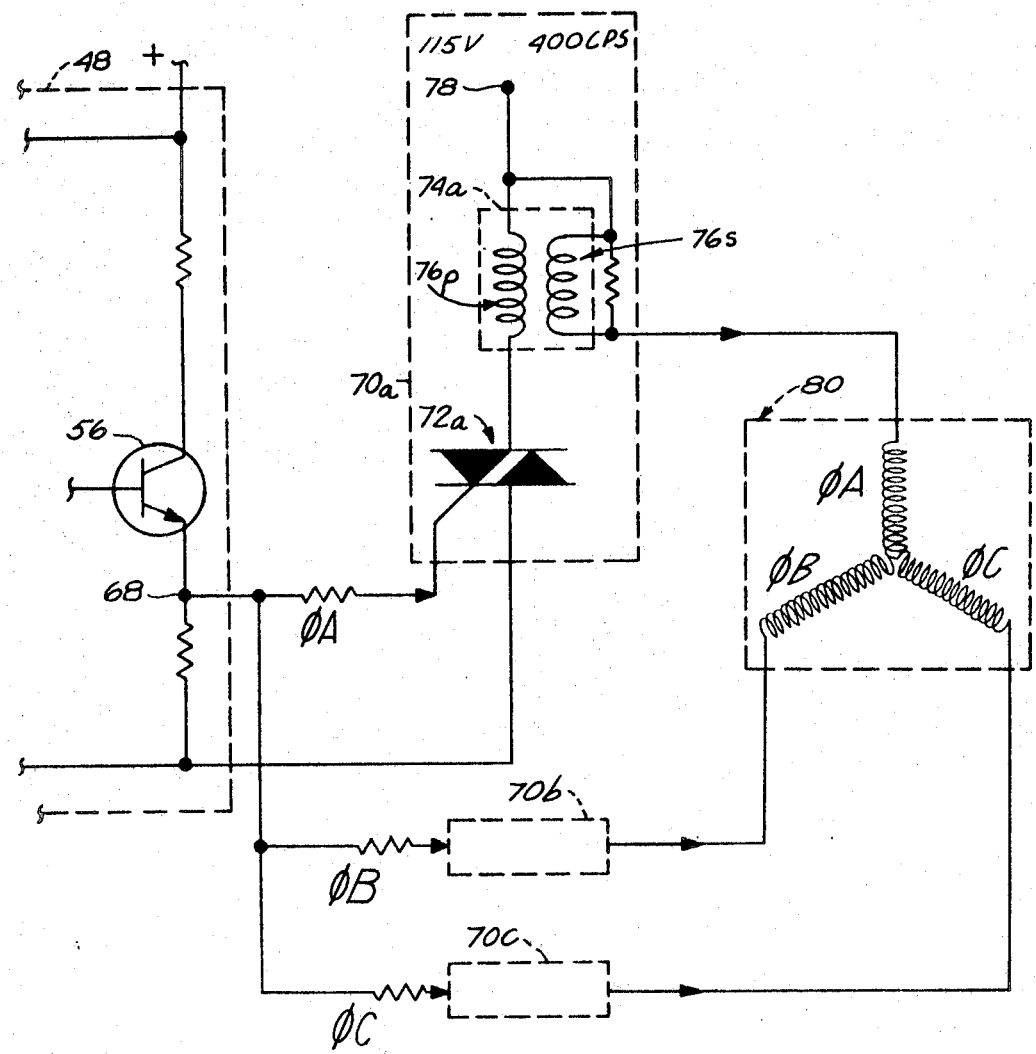

INVENTORS.
LOREN E. CURRISTON
BRONIUS M. DRAUGELIS
BY
Sidney Magnes
AGENT

United States Patent Office 3,463,986
Patented Aug. 26, 1969

3,463,986
REDUCED-POWER MOTOR OPERATION
Loren E. Curriston, Woodland Hills, and Bronius M. Draugelis, South Pasadena, Calif., assignors to North American Rockwell Corporation, a corporation of Delaware
Filed Feb. 23, 1967, Ser. No. 617,956
Int. Cl. H02p 1/46, 3/18, 5/28
U.S. Cl. 318—166                                12 Claims

ABSTRACT OF THE DISCLOSURE

An arrangement having a timing-circuit and a repetition-rate circuit for producing control-pulses that repeatedly trigger a power-supply to provide voltage-pulses of abnormally-high voltage, so that a motor—driven by said power-supply—operates substantially continually in a reduced-power state.

Background of the invention

Figure 4:
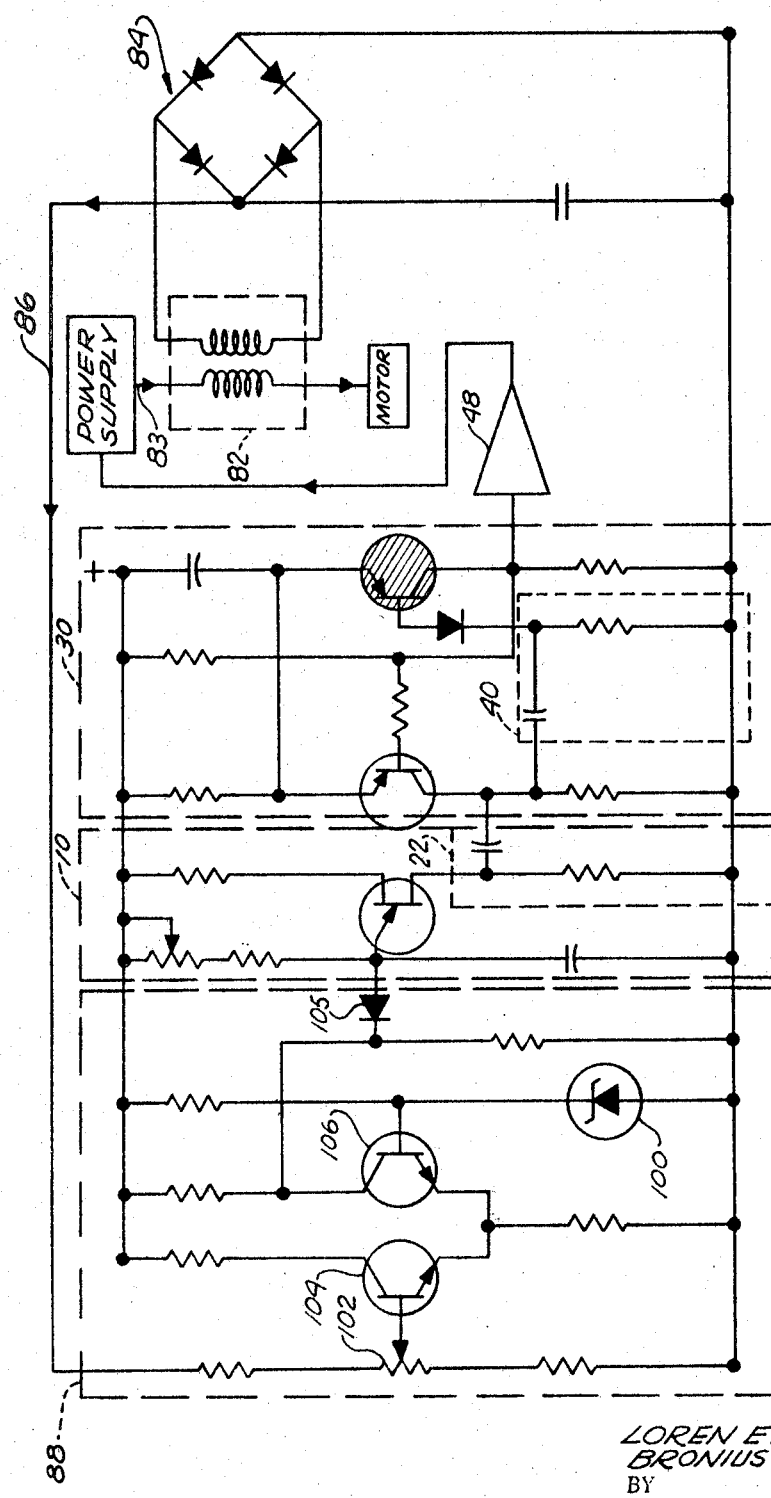

It is well known that various electric motors have particular characteristics that make each type of motor preferable for certain applications. For example, the so-called "synchronous" motor is one that runs at a substantially constant speed, which is determined by the "frequency" of its power-supply. The constant-speed characteristic of this type of motor is practically universally desirable for devices such as clocks, timers, recording and play-back devices, and gyroscopes—the latter usage of constant-speed motors being extremely important, because the gyroscope's characteristics depend upon its having a constant predetermined rotational speed. Most types of synchronous motors, however, have their own particular disadvantages, i.e., they may require a special structure (such as a "squirrel cage") to assist the motor in starting and approaching its synchronous speed; or they may require a laminated structure that may introduce unbalance and/or weight-shifting problems.

Another type of motor, known as a "hysteresis-synchronous" motor, has the characteristics that it develops satisfactory starting torque, and quickly approaches—and maintains—synchronous speed. In essence, this motor has a stator whose windings produce a rotating magnetic field; and has a rotor that is essentially a ring of iron. The rotating magnetic field produced by the stator-winding induces, into the rotor ring, a series of magnetic poles that are "dragged along" by the rotating magnetic field; this dragging action producing the starting torque and synchronous speed of the motor.

Ordinarily, the motor is exposed to its design voltage; this normal-voltage causing the motor to operate in its normal state, and to draw its normal current from its power-supply. In operation of an embodiment of the invention, we have found that—for reasons not completely understood—if the motor is exposed to a higher-than-normal voltage, and is then returned to its normal voltage, the motor then requires a smaller-than-normal amount of electric current for its operation. In fact, we have found that this technique provided a 50% power savings when used with a Lear Siegler Inverter model SFC-3-450062 power-supply, and a Kearfott model 421344-3 three-phase hysteresis-synchronous gyro motor.

Thus an appreciable advantage can be achieved by operating a hysteresis-synchronous motor in its reduced-power mode, because a smaller, lighter-weight, lower-valued, power-supply may be used; and in many operations where size and weight must be minimal, the reduced-power mode of operation offers decided advantages.

Unfortunately, however, this reduced-power mode of operation is relatively unstable, and is easily disturbed by many factors: such as momentary power interruptions or fluctuations, certain perturbations, variations of the load, etc. Thus, if a motor of this type is "over-voltaged" in order to operate in a more efficient manner, but the usage is such that it is constantly being jolted or exposed to perturbations, these conditions cause the motor to switch from its unstable reduced-power state to its normal operation state—at which time it takes its normal, larger, load current from the power-supply.

In those cases where the motor is being operated from a smaller limited-capacity power-supply, this reversion to a normal mode of operation is undesirable because it may overload the power-supply. This combination of operating conditions may exist if gyroscopes are used where the power-supply is limited from a weight and size point-of-view, and the stabilizing gyroscopes are constantly being perturbed. Therefore, it is desirable to operate the gyro-motors in their reduced-power mode, despite their tendency to revert to their normal mode of operation.

Objects and drawings

It is therefore an object of the invention to cause a motor to continually operate in a reduced-power mode, despite perturbations.

It is another object of the invention to repeatedly apply an abnormally-high voltage to a motor for assuring a continual reduced-power mode of operation.

The attainment of these objects and others will be realized from the teachings of the following detailed description, taken in conjunction with the drawings, of which FIGURE 1 is a schematic diagram for periodically producing an abnormally-high voltage that is applied to a gyro-motor to assure a continual reduced-power mode of operation;

FIGURES 2a–2f show a plurality of waveforms associated with the schematic diagram of FIGURE 1;

FIGURE 3 shows another way of causing a power-supply to produce abnormally-high voltages for causing a motor to operate in a reduced-power mode; and FIGURE 4 shows a schematic diagram for producing a sensing-signal when a motor has dropped out of its reduced-power mode of operation, and for causing the sensing-signal to produce an abnormally-high voltage for reinstating the reduced-power mode of operation.

Synopsis

One embodiment of the present invention is directed to circuitry that senses when a motor has lost its reduced-power mode of operation, the circuitry then applying an abnormally-high voltage-pulse to assure a continual reduced-power operation mode. Another embodiment of the invention, rather than sensing when the motor has reverted to its normal operation, periodically produces over-voltage pulses that are applied to the motor to continually assure the reduced-power mode of operation. A voltage-boosting transformer is disclosed for use with fixed-voltage power supplies.

Description of the invention

FIGURE 1 shows an electronic circuit for periodically producing abnormally-high voltage-pulses for causing a motor to operate in its reduced-power mode. The illustration shows a trigger-signal producing circuit that comprises an oscillator 10, which may be a relaxation-type oscillator that produces internal sawtooth-waveform voltages as illustrated at 12 of FIGURE 2a. Oscillator 10 of FIGURE 1 comprises a uni-junction transistor 14 and a control-potentiometer 16; the sawtooth-waveform having a repetition-rate—typically twenty per minute—controllable by potentiometer 16. The output-waveform at point 18 is a pulse-like waveform, such as is shown at 20 of FIGURE 2b; waveform 20 being applied—in FIGURE 1—to a differentiator-circuit 22 whose output is a train of trigger-signals that comprise positive-going "pips" 24 and negative-going "pips" 26, as illustrated in FIGURE 2c, these pips appearing at point 28 of FIGURE 1.

The trigger-signals at point 28 are applied to a monostable multivibrator circuit 30, whose operation is such as to produce—at point 44—a rectangular waveform such as is shown at 34 of FIGURE 2d. The operation of monostable multivibrator circuits is well known; but broadly stated, multivibrator 30 comprises two transistors 36 and 38 of which transistor 36 is normally conductive, and transistor 38 is normally non-conductive. The pips at point 28 are transmitted through timing circuit 40 and diode 42 to the base-electrode of normally-conductive transistor 36. Here the positive-going pips cut off transistor 36 for a period of time controlled by timing-circuit 40. The inherent operation of the multivibrator circuit 30 is such that when one transistor is turned on, the other one is turned off; so that the output signal from the collector-electrode of the now-cutoff transistor 36 is transmitted to the base-electrode of transistor 38, and turns on transistor 38. In this way, multivibrator 30 has switched from one state to another. After a predetermined interval of time, transistor 36 again becomes conductive, and transistor 38 again becomes non-conductive; this characteristic of spontaneously reverting to the stable state identifying this type of multivibrator circuit as a monostable multivibrator. The output of multivibrator 30 appears at point 44, and comprises a series of rectangular-waveforms 34 of control-signals of the type shown in FIGURE 2d.

In order to have a useful amplitude, the control-signals at point 44 of FIGURE 1 are amplified—and inverted—by amplifier 48 which may comprise—as illustrated—two series-connected transistors, so that the output of amplifier 48 is available at point 50 as amplified control-pulses (indicated at 52 of FIGURE 2e) for controlling the operation of a power-supply.

In this way, the circuit of FIGURE 1 produces periodic control-pulses; these having a repetition-rate controlled primarily by potentiometer 16, and having a duration controlled primarily by timing-circuit 40. The control pulses, in turn, control the operation of a power-supply to produce a voltage waveform as indicated at 60 of FIGURE 2f.

Many power-supplies are of the "regulated" type, i.e., they are capable of producing a larger-than-necessary voltage, but are regulated to produce a constant lower voltage. Furthermore, many of these power-supplies have a voltage-regulation adjustment, which frequently comprises a potentiometer—indicated at 54 of FIGURE 1. This type of power-supply is readily adapted for use with the circuit shown in FIGURE 1. Here potentiometer 54 is connected through transistor 56 of amplifier 48 in such a way that when transistor 56 becomes conductive during the control-signal interval of time, a portion of potentiometer 54 is effectively bypassed, or connected to ground, by the conductive transistor 56. As a result, the power-supply now produces a voltage-pulse, as indicated at 60 of FIGURE 2f, which is applied to the motor.

Under some conditions, it may be desirable to over-voltage the motor manually, so a manual switch 58 is provided for manually bypassing, or grounding, potentiometer 54.

In using the type of power-supply discussed in connection with FIGURE 1, the ouput voltage of the power-supply is applied to the motor windings, in accordance with the motor requirements and principles well known to those skilled in the art.

In accordance with the above explanation, the motor is thus periodically exposed to abnormally-high voltage-pulses to assure that the motor remains substantially continually in its over reduced-power mode of operation—despite perturbations, load variations, or the like.

A typical over-voltage waveform of FIGURE 2f has over-voltages pulses, about twenty milliseconds in duration, occuring about twenty times per minute; and having a magnitude of about two-hundred volts—as compared with the one-hundred-fifteen volts normally applied to the motor. In its normal state a typical motor may draw a current of about one-hundred millamperes. During the two-hundred volt over-voltage pulse, the motor current increases—for about twenty milliseconds—to about one-hundred and eighty milliamperes; and then—during the normal one-hundred-fifteen volt interval—the motor current drops from its normal one-hundred milliamperes to about forty milliamperes. Thus, even though the motor takes increased power for a short interval, it takes less power for a much longer interval of time.

The reduced-power state is produced by a pulse of abnormally-high voltage, which is limited primarily by the design of the motor windings; so the duration of the over-voltage pulse is preferably as short as possible. In order to assure that the motor achieves its reduced-power state, it appears desirable that each over-voltage pulse contain about ten cycles of the power-supply voltage—i.e., the voltage-pulse duration should be about ten times as long as a power-supply voltage cycle, since a single cycle of the power-supply voltage may possibly fail to produce the reduced-power mode. The repetition-rate of the over-voltage pulse is determined by the occurrence-rate of the perturbations. Thus, the desideratum for maximum efficiency and power reduction would comprise high-voltage pulses having an extremely short duration and a low repetition-rate; and the power-supply may therefore be appreciably smaller and lighter in weight in view of the reduced power requirements. Experiments have shown that the power requirements may be reduced by as much as eighty percent.

There are of course other types of power-supplies; and some of these provide a fixed voltage, without permitting access to the regulating circuit. A way of causing one of these other types of power-supplies to provide abnormally-high-voltage pulses for over-voltaging a motor is shown in FIGURE 3. Here the control-pulse of transistor 56 of amplifier 48 (see FIGURE 1) is taken from point 68, and is applied to a control-circuit 70a; this control-circuit comprising an electronic gating device known as a "Triac"—indicated at 72a—which is described in Application Note 200.35—5/64 "Triac Control for AC Power" issued by the General Electric Rectifier Components Department. Basically, the Triac controls the passage of AC electricity by means of a gating-signal applied to its gating terminal. Control circuit 70a also comprises voltage-boosting transformer 74a having a primary winding 76p and a secondary-winding 76s, both of which are connected in common to terminal 78 of the power supply. Ordinarily, for normal operation, electricity—having an exemplary value of one-hundred-fifteen volts and a frequency of four-hundred cycles per second—is shown as being applied from terminal 78 through secondary-winding 76s to the phase-A winding of a three-phase gyro-motor 80. In this normal condition, winding 76p does not boost the voltage in winding 76s, since the circuit of winding 76p is caused to be inoperative by Triac 72a, which is cut off. Thus, the phase-A winding is excited in its normal manner.

A control-pulse, occurring at point 68, is applied as a gating-signal to the gate-electrode of normally cut-off Triac 72a; which thereupon becomes conductive, and permits electricity to flow from terminal 78 of the power-supply through primary-winding 76p in the form of a control-pulse. In one arrangement, windings 76p and 76s have a turns-ratio that induces an extra boosting-voltage of about eighty-five volts into the secondary winding. The effect is that an additional voltage is superimposed upon the voltage in secondary-winding 76s; so that phase-A winding receives an abnormally-high voltage-pulse comprised of its normal voltage boosted an extra voltage obtained by means of the described control circuit.

FIGURE 3 indicates symbolically that the control-pulse at point 68 is also applied to phase-B and phase-C control circuits 70b and 70c which are energized from the individual phases of the power supply, like circuit 70a, and whose outputs are applied to the phase-B winding and the phase-C windings respectively of gyro-motor 80. In this way, the circuit of FIGURE 3 normally applies a multi-phase normal voltage to a gyro-motor, this voltage being periodically increased to an abnormally-high voltage-pulse that assures that the gyro-motor is in a substantially continual reduced-power state.

Alternatively, a three-phase control-circuit may be used to provide suitable voltages for the three phase-windings of the motor.

The above discussion has indicated that a hysteresis-synchronous motor may be operated in a reduced-power mode that reduces its power requirements, but that if this motor is subjected to perturbations, it will revert to its normal mode of operation, and will require a larger load current. In order to continually operate the motor in its reduced-power state, the above description has shown circuitry that produces periodic over-voltage pulses that cause the motor to operate substantially continually in its reduced-power state. The above circuitry is particularly well-adapted to those conditions where perturbations occur relatively frequently.

Some uses, however, are such that perturbations are relatively infrequent; and in these cases, it may be desirable to use a somewhat different approach to the problem of assuring that the motor operates in its reduced-power state; and, only on the occurrence of a suitable sensing-signal indicating that the motor had reverted to normal operation, does the circuit produce a control-signal that provides an over-voltage pulse for reestablishing the reduced-power state of operation of the motor.

Circuitry for achieving this effect is shown in FIGURE 4. Here a current-transformer 82 is connected in the feed-wire 83 between a power-supply and a motor; the operation of current-transformer 82 being such that it produces a signal corresponding to the electric current passing through it. Thus, current-transformer 82 produces a normal output signal during the reduced-power mode of operation of the motor; and produces an abnormal output-signal when the motor reverts to its high-power normal state of operation, and thus draws a larger current from the power supply. The output-signal produced by current-transformer 82 is applied to a full-wave rectifier 84, which thereupon produces a D.C. sensing-signal that is applied over wire 86 to a comparator 88.

Comparator 88 may take any suitable form, as long as it produces a comparator-signal that indicates that the motor has lost its reduced-power mode of operation, and has reverted to its normal mode of operation. The comparator 88 shown in FIGURE 4 comprises a Zener-diode 100 that provides a reference potential, a circuit comprising a sensitivity-potentiometer 102, and two transistors 104 and 106 that produce an output-signal when the sensing-signal exceeds a predetermined value established by the Zener-diode. When comparator 88 has produced a comparator-signal, it becomes necessary to apply this comparator output-signal to the power-supply, so that the power-supply may produce an abnormally-high voltage-pulse that will cause the motor to again assume its reduced-power mode of operation.

Ordinarily the above approach would be quite satisfactory, except for the following possible situation. Assume that the motor has lost its reduced-power mode of operation, and has reverted to its normal mode of operation. The sensing-circuit has produced a sensing-signal that has been applied to the comparator, which has in turn produced a signal for causing abnormally-high voltage to be produced by the power-supply. Assume further, that for some reason this abnormally-high voltage-pulse has not produced the desired reduced-power state; and that the motor continues to operate in its high-current normal state. Unless the circuitry of the comparator, the power-supply, and the control-circuit, are carefully matched, it is possible that the power-supply would provide only a single over-voltage pulse; and would then return to its function of providing current to the gyro-motor—which however, is still in its normal state, and draws its normal large-current. Alternatively, the power-supply may remain in a state that continually produces an abnormally high voltage.

Since the present concept permits the gyro-motor to operate with a smaller-than-normal current, the power-supply is designed to provide this smaller current continuously and to be able to occasionally provide an abnormally high-voltage—in this way permitting the power-supply to be smaller and lighter in weight than ordinarily. However, it must be realized that the power-supply is not designed to continuously produce the larger current required when the motor is in its normal state; and that neither it or the gyro-motor is designed to operate continuously in an abnormally-high voltage state. If the power-supply is required to produce this larger current or higher voltage for any appreciable period of time, it may become overloaded and burn out; or if the gyro-motor is unnecessarily exposed to abnormally-high voltage, it may burn out. Therefore, it becomes desirable to assure that the gyro-motor quickly reverts from its normal state, when this occurs, to its reduced-power state—in order that the power-supply and the motor may operate safely.

As indicated above, properly-matched circuitry will obviate the danger of power-supply burn-out and/or motor burn-out; but at times the availability of only certain motors and/or certain power-supplies prevents this idealized matching—and power-supply or motor burn-out could be a real problem.

To overcome the above situation, the output signal from comparator 88 of FIGURE 4 is preferably applied via diode 105 to a control-pulse producing circuit—such as the combination of oscillator 10, multivibrator 30, and amplifier 48 previously described. Diode 105 normally disables the oscillator, but upon occurrence of an output signal from comparator 88, the oscillator 10 and amplifier 48 commence to operate as previously described. The effect of this circuitry is to have the sensing-signal initiate a series of periodic control-signals as inidicated in FIGURE 2e, so that the power-supply is continually energized to produce abnormally-high voltage-pulses as previously described. The series of resultant voltage-pulses assures that the motor will revert to its reduced-power mode of operation. At that time, the reduced load current produced by the reduced-power mode of operation causes the sensing-circuit 84 to terminate its sensing-signal; the absence of the sensing-signal terminating the output from comparator 88, and thus disabling the voltage-pulse producing circuitry. In the above manner, the power-supply is activated to produce its abnormally-high voltage for brief instants, only when this becomes necessary.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. In combination:

a hysteresis synchronous motor;

a multi-phase power-supply for the motor;

means for repeatedly increasing the voltage applied to the motor from each phase of the power-supply;

means for sensing the current of said motor; and means, responsive to the sensing means, for initiating said increase of voltage.

2. In combination:
a hysteresis synchronous motor;
a multi-phase power-supply for the motor;
means for repeatedly increasing the voltage applied to the motor from each phase of the power-supply;
means for sensing the current of said motor; and
means, responsive to the sensing means, for initiating activation of said means for repeatedly increasing voltage.

3. In combination:
a hysteresis synchronous motor;
a multi-phase power-supply for the motor;
means for repeatedly increasing the voltage applied to the motor from each phase of the power-supply;
a first winding coupling the power-supply to each motor phase;
said means for repeatedly increasing the voltage comprising a second winding coupled with the power supply and indirectly coupled with the first winding, and gating means for selectively enabling the second winding.

4. In combination:
a hysteresis synchronous motor;
a multi-phase power-supply for the motor;
means for repeatedly increasing the voltage applied to the motor from each phase of the power-supply;
said last means comprising means for boosting the normal voltage of said power supply.

5. In combination:
a hysteresis synchronous motor;
a multi-phase power-supply for the motor;
means for repeatedly increasing the voltage applied to the motor from each phase of the power-supply;
said last means comprising means for superposing an additional voltage onto the voltage normally produced by said power supply.

6. In combination:
a hysteresis synchronous motor;
a multi-phase power-supply for the motor;
means for repeatedly increasing the voltage applied to the motor from each phase of the power-supply;
sensing means for producing a sensing-signal on the disappearance of said reduced-power state; and
means for causing said sensing-signal to produce said voltage-pulses.

7. In combination:
a hysteresis synchronous motor;
a multi-phase power-supply for the motor;
means for repeatedly increasing the voltage applied to the motor from each phase of the power-supply;
said last means comprising means, comprising an oscillator, for periodically producing an output waveform;
means for causing said output waveform to produce a train of trigger-signals;
a multivibrator;
means for applying said train of trigger-signals to said multivibrator for producing a series of control-pulses; and
means for causing said control-pulses to cause said power-supply to produce periodic voltage-pulses.

8. In combination:
a hysteresis synchronous motor;
a multi-phase power-supply for the motor;
means for repeatedly increasing the voltage applied to the motor from each phase of the power-supply;
said last means comprising means, comprising an oscillator, for periodically producing a waveform;
means for causing said waveform to produce a train of trigger-signals;
a monostable-multivibrator;
means for applying said train of trigger-signals to said monostable-multivibrator for causing said monostable-multivibrator to produce a series of gating-pulses;
means for amplifying said series of gating-pulses;
a gating device;
means for applying said amplified series of gating-pulses to said gating device for producing a chain of control-pulses; and
means for applying said chain of control-pulses to said power-supply for producing periodic voltage-pulses.

9. In combination:
a hysteresis synchronous motor;
a multi-phase power-supply for the motor;
means for repeatedly increasing the voltage applied to the motor from each phase of the power-supply;
said last means comprising means, comprising a relaxation oscillator, for periodically producing a sawtooth-type output waveform;
means for differentiating said sawtooth-type output waveform for producing a train of trigger-signals;
a monostable-multivibrator;
means for applying said train of trigger-signals to said monostable-multivibrator for causing said monostable-multivibrator to produce a series of gating-pulses;
first, second, and third gating devices;
said power-supply having a three-phase output;
means for applying said series of gating-pulses to said gating devices for producing three chains of gating-pulses; and
means for applying said individual chains of gating-pulses to respective phase-outputs of said power-supply for producing periodic voltage-pulses at each phase-output.

10. The combination of claim 6 wherein said sensing-means comprises a current-sensor connected in a lead-wire from said power-supply to said motor, for producing a sensing-signal when the reduced-power mode of operation terminates.

11. The combination of claim 6 wherein said sensing-means comprises a current-transformer connected in a lead-wire from said power-supply to said motor for causing said current-transformer to produce an output-signal when the reduced-power mode of operation terminates, and rectifier-means for converting said current-transformer output-signal into a sensing signal.

12. The combination of claim 11 including comparator means for producing a comparator-signal when said sensing-signal exceeds a predetermined reference-signal; and means for causing said comparator-signal to produce said voltage-pulses.

References Cited

UNITED STATES PATENTS

| 2,429,807 | 10/1947 | Dewan | 318—166 |
| 2,458,100 | 1/1949 | Roters | 318—166 |
| 2,867,761 | 1/1959 | Hartmann | 318—230 |
| 3,129,380 | 4/1964 | Lichowsky | 323—45 |
| 3,201,683 | 8/1965 | Hjermstad et al. | 323—45 |

ORIS L. RADER, Primary Examiner

G. Z. RUBINSON, Assistant Examiner

U.S. Cl. X.R.

318—189, 230; 323—24, 45